April 7, 1936.  C. A. FOURNESS ET AL  2,036,209
MACHINE FOR MAKING ABSORBENT PADS
Filed July 11, 1932    4 Sheets-Sheet 4
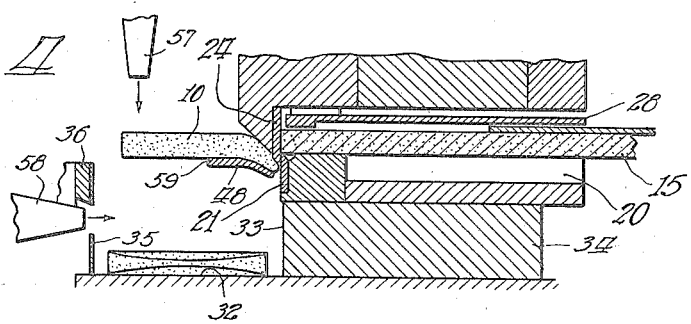
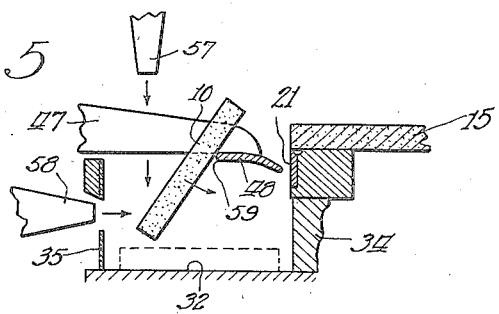
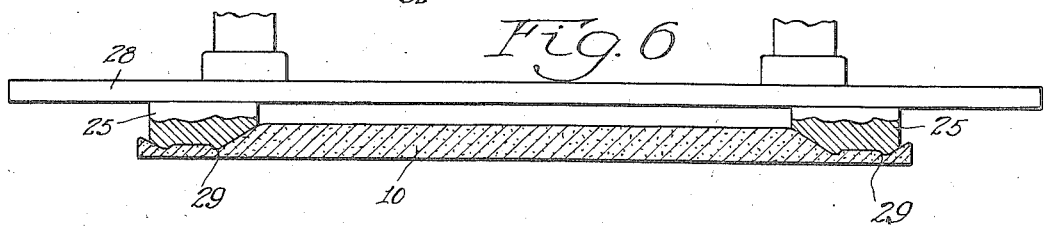
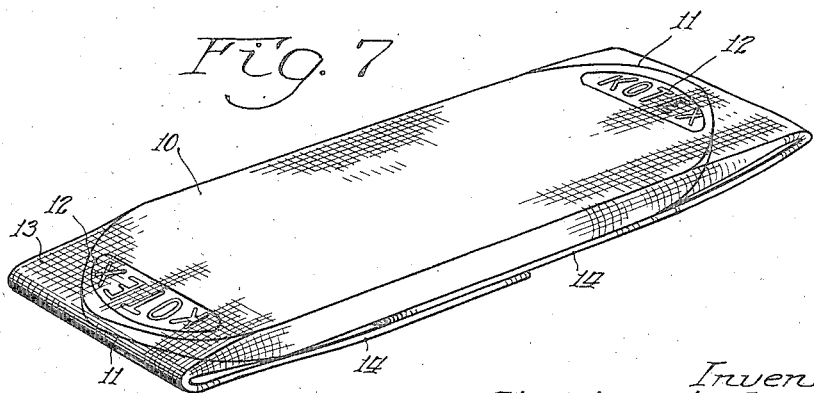
Inventors
Charles A. Fourness
Oscar E. Hagen
By Fisher, Clapp, Soans & Pond Attys.

Patented Apr. 7, 1936

2,036,209

UNITED STATES PATENT OFFICE 2,036,209

MACHINE FOR MAKING ABSORBENT PADS

Charles A. Fourness, Appleton, and Oscar E. Hagen, Neenah, Wis., assignors to International Cellucotton Products Company, Chicago, Ill., a corporation of Delaware Application July 11, 1932, Serial No. 621,940

13 Claims. (Cl. 154—29)

This invention relates to mechanism for making absorbent pads, particularly such as are used for making sanitary napkins. The main objects of the invention are to provide mechanism for suitably marking, for example, by embossing, the pads with a trade name or other desired matter; to provide mechanism whereby pads so marked may be wrapped in a suitable gauze or like wrapper in such a way that the marking on the pads will remain visible; to provide a unitary structure for marking the pads and for cutting the pads with rounded or tapered ends from a supply strip of padding material; and in general, it is the object of the invention to provide an improved machine for making sanitary napkins.

Other objects and advantages of the invention will be understood by reference to the following specification and accompanying drawings (4 sheets) in which is disclosed a machine embodying a selected form of the invention.

In the drawings:—

Figs. 4 and 5 are fragmentary sectional views corresponding to a part of Fig. 1 and illustrating the method of operation.

Fig. 6 is a rear elevation of certain mechanism, certain parts being shown in section to more clearly illustrate the structure.

Fig. 7 is a perspective illustrating a sanitary napkin embodying the construction produced by the machine disclosed.

Figure 1:
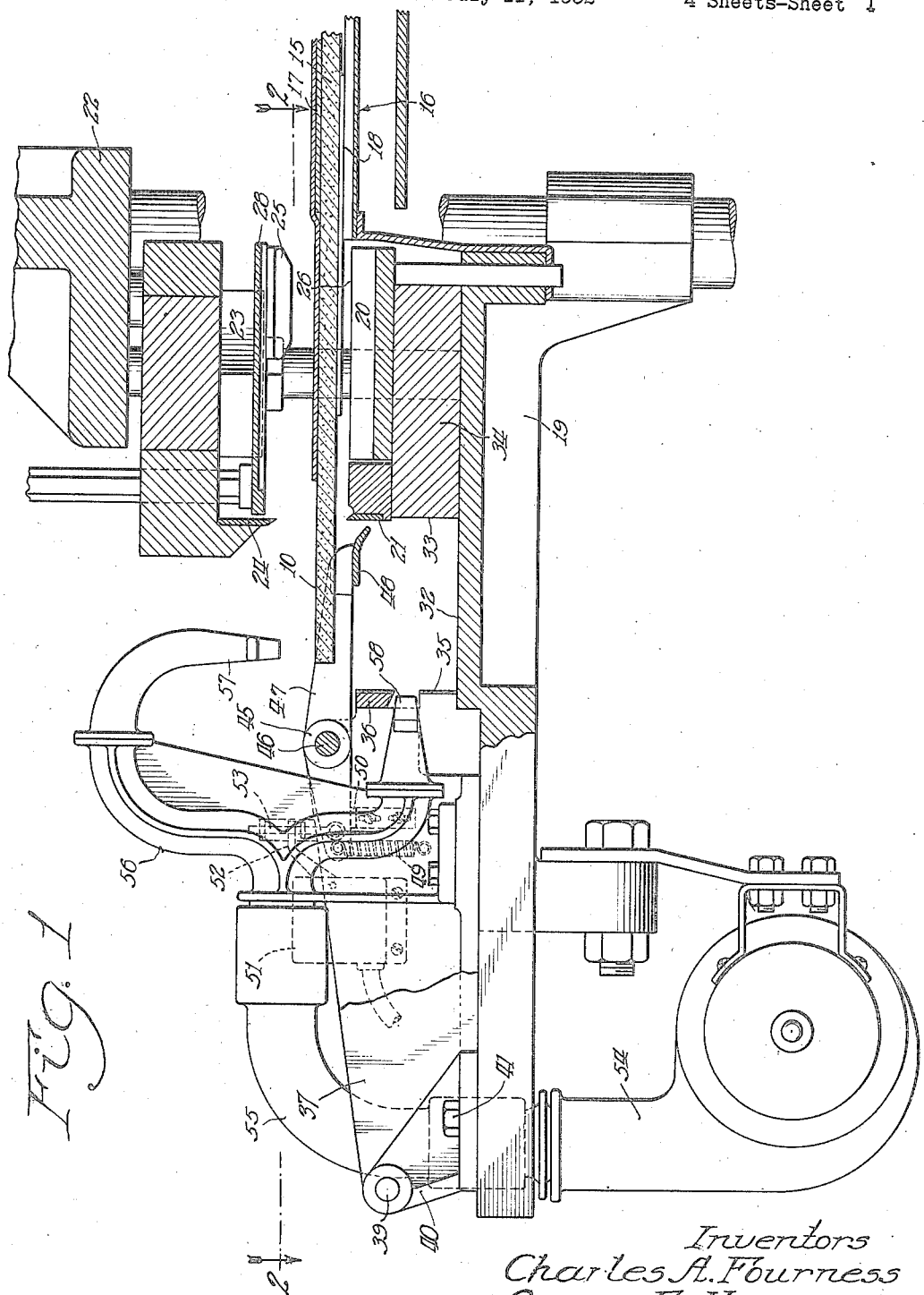
Fig. 1 is an elevation partly in section.

Referring now to the drawings, and particularly to Fig. 7, the sanitary napkin herein contemplated includes an absorbent pad 10, preferably made of cellulose wadding material and provided with rounded ends as indicated at 11—11. The end portions of the pad are compressed together as shown at 12 and a trade name or other suitable indicia may be embossed on the ends of the napkin within the compressed area. A wrapper 13 of gauze or other suitable textile material encloses the pad, and the wrapper is preferably applied in such a manner that a single layer of the gauze covers the face of the pad on which the embossing appears while marginal portions of the gauze wrapper are overlapped on the other side of the pad to envelop the same. Attachment tabs or flaps 14—14 are formed integral with the gauze wrapper by making the same of greater length than the pad, said tabs or flaps being folded under the pad substantially as illustrated for packing purposes.

For forming pads such as the pad 10, a strip 15 of wadding is propelled over a supporting table 16 by means of any suitable feed mechanism, for example, such as shown in the patent to Oscar T. Thompson, No. 1,869,177, issued July 26, 1932. The mechanism therein disclosed is operative to advance the wadding strip 15 step by step and it is arranged in the present mechanism to feed the strip between various devices which will now be described.

It will be understood that the wadding strip 15 is of predetermined thickness and of a width corresponding to the length of the desired pads. Parts of the wadding feed mechanism are indicated at 17 and 18 and these parts operate to intermittently advance the wadding strip a distance corresponding to the width of the desired pad.

A supporting table or frame 19 supports a lower die block 20 and a lower cutting knife 21, these parts being located below the path of travel of the wadding strip 15. A vertically movable ram 22 supports an upper die block 23, an upper knife 24 and an embossing die 25.

Suitable mechanism, well-known to those skilled in the art and not herein shown, serves to move the ram 22 and the parts carried thereby, up and down in synchronized relation to the feed movements of the wadding strip 15. The downward movement of the ram 22 and parts associated therewith takes place when the wadding strip 15 is at rest and the embossing die 25, die block 23, and upper knife 24 cooperate respectively with the upper surface 26 of the die block 20, the cutting edges 27 (Fig. 2) of the lower die block, and the lower knife 21. A stripper plate 28 is provided and operated in any suitable manner to prevent the wadding material from adhering to the upper die block 23 when the latter is moved upwardly upon the completion of its notching operation.

Figure 2:
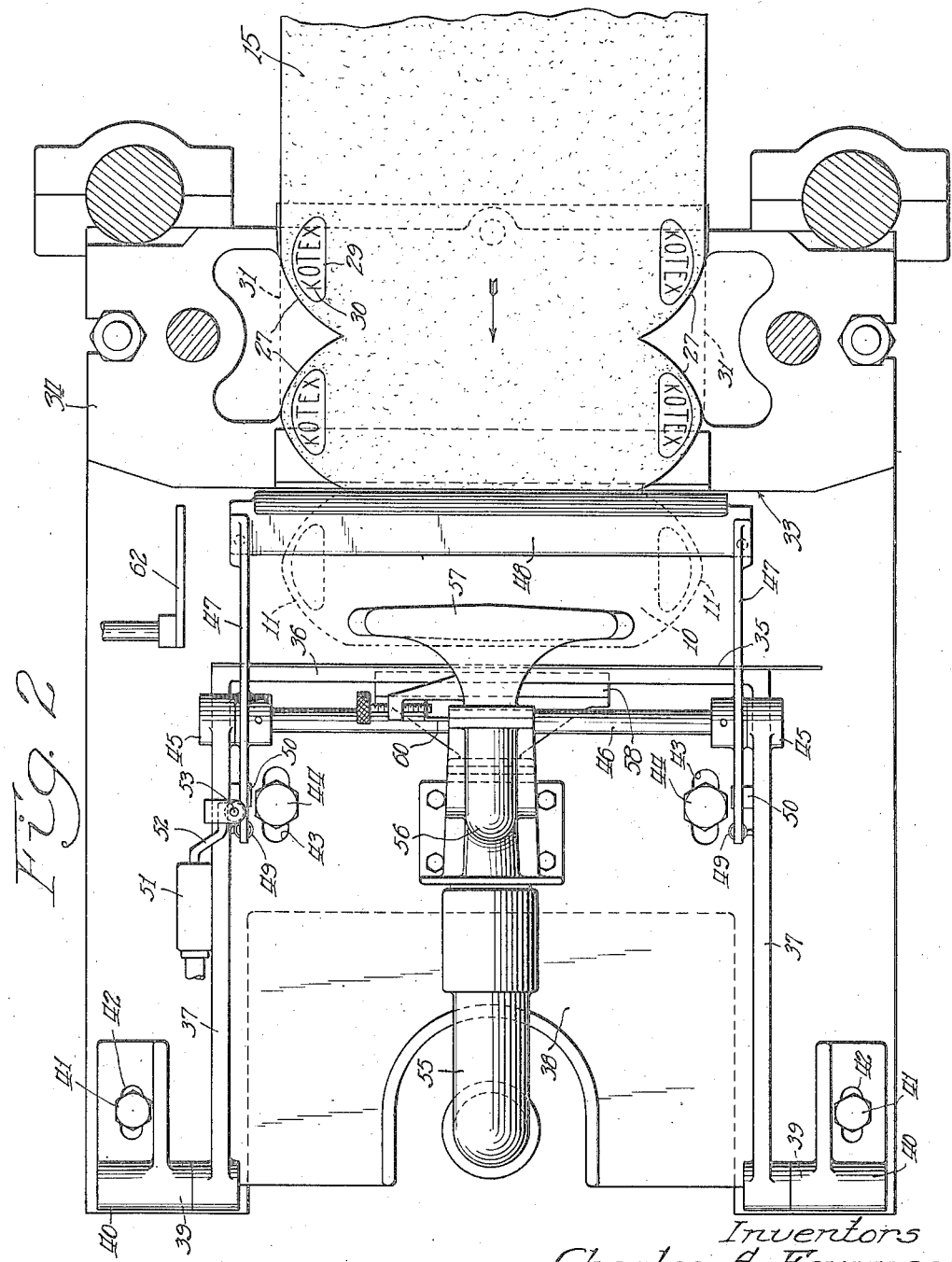
Fig. 2 is a plan section on the line 2—2 of Fig. 1.

By reference to Fig. 2, it will be seen that the embossing die 25 serves to compress and emboss end areas of the padding strip as indicated at 29, a trade name or other indicia being incidentally embossed in the compressed area 29 as indicated at 30. The upper and lower dies 23 and 20 respectively serve to remove a substantially triangular shaped marginal portion of the strip, the sides of the triangular portion being indicated by the lines 27—27 and the base of the triangular portion being indicated by the broken line 31. The upper and lower knives 24 and 21 respectively cooperate to sever the forward end portion of the strip from the strip along lines joining the apexes of the triangular portions, the result being that a pad element 10 is formed having rounded ends 11 substantially as described in connection with Fig. 7.

The cut-off pads 10 are to be deposited on the table surface 32 between the face 33 of the lower die block supporting shoe 34 and a guide plate 35 which is carried by the front wall 36 of a bracket frame. Said bracket frame includes the front wall 36, side walls 37—37 and a bottom 38, these parts being preferably formed integrally, for example by casting, and the said bracket frame is pivotally mounted as indicated at 39—39 on brackets 40—40 which are secured to the main frame or table 19. As indicated in Fig. 2, the brackets 40—40 are secured to the frame by means of suitable cap screws 41—41 which extend through slots 42—42 in the brackets whereby the brackets may be adjusted relative to the main table so as to correspondingly adjust the bracket frame and parts carried thereby.

The bottom 38 of the bracket frame just described is slotted as indicated at 43—43 and cap screws 44—44 pass through said slots and fit suitable tapered openings in the main table 19 to thereby fasten the bracket frame in operative position.

The side walls 37—37 of the bracket frame are provided with bosses 45 which are suitably apertured to receive a transversely extending shaft 46 which may rock in the bosses 45. Arms 47—47 are secured to the shaft 46 adjacent the respective bosses 45—45 and the said arms are provided at their outer ends with a connecting bar 48.

The connecting bar 48 constitutes a shelf which serves to temporarily support the cut-off pad member 10 substantially as illustrated in Fig. 4 when the upper knife is in its downward cutting position. The opposite ends of the arms 47 are connected to side members 37—37 of the bracket frame by means of coil springs 49 which serve to yieldingly maintain the arms and shelf 48 in pre-determined position of adjustment.

Adjustable stop elements 50 carried by the side members 37—37 serve to limit the upward movement of the shelf 48 under the influence of the springs 49.

If, under any circumstances, the zone of operation of the upper knife should become clogged with wadding material, the excess thickness of such wadding material over the shelf 48 will cause the shelf to move downwardly under the force of the downwardly moving upper knife and hence the arms 47—47 will be rocked about the axes of the shaft 46 and against the tension of the springs 49. A limit switch device 51 is connected by means of an arm 52 and a rod 53 to one of the arms 37 so that when the shelf end of the arms is moved downwardly, the opposite ends thereof moving upwardly will actuate the limit switch to break an electric circuit to an electric motor which is provided for operating the mechanism.

The pad element 10 which is formed in the manner above described, when separated from the wadding strip is arranged with its embossed ends facing upwardly. In order to facilitate the enclosing of the pad in a gauze wrapper in such a manner that the embossed matter will be covered only by a single layer of gauze, it is preferred to turn the pad in such a way that when it is deposited on the table surface 32, the embossed matter will face downwardly.

In this embodiment, the pad 10 is inverted as it descends from the shelf 48 to the table surface 32 on which it is to be deposited with the embossed mark facing downwardly. By reference to Figs. 1, 4, and 5, it will be seen that the mechanism is provided with a blower 54, suitably driven by an electric motor or otherwise, the blower being connected by means of a length of flexible hose 55 to a nozzle 56. The nozzle 56 is provided with two outlets 57 and 58, the nozzle 57 being arranged to direct a blast of air downwardly against the top of the unsupported side of the pad 10. The outlet 58 is arranged to direct a blast of air cross-wise of the table surface 32. By reference to Fig. 5, it will be seen that the air blast from the outlet 57 causes the pad 10 to turn about the outer edge 59 of the shelf 48 until the blast of air from the outlet 58 strikes the top of the unsupported side of the pad to continue the turning of the pad so that the initial top side of the pad will be deposited in engagement with the table surface 32; or in other words, so that the initial top side of the pad becomes the bottom side when the pad is deposited on the table 32.

Figure 3:
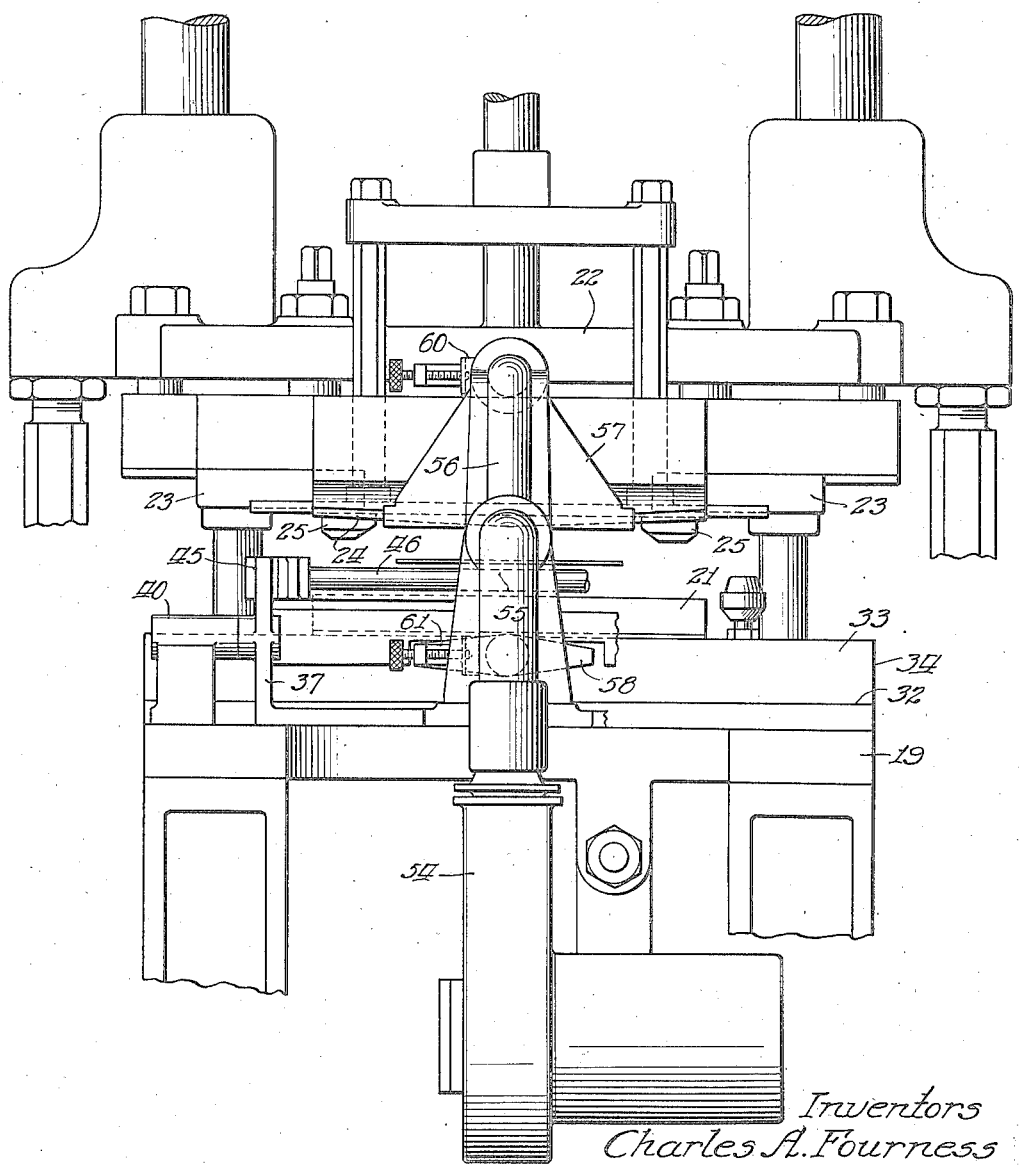
Fig. 3 is an end elevation.

The strength of the air blast from each of the outlets 47 and 58 will be controlled by controlling the speed of the blower 54 and the air jets are independently controllable by means of suitable adjustable slide valves such as indicated at 60 and 61 in the outlets 57 and 58 respectively (see Figs. 2 and 3).

After the pad 10 has been deposited on the table part 32, a pusher 62, substantially as illustrated in said patent to Oscar T. Thompson, is operated to feed the pad to mechanism for applying a gauze wrapper to the pad, such mechanism being also shown in the said Thompson patent.

It will be understood that the pad is fed into a position intermediate the width of a strip of gauze and that the marginal portions of the gauze strip beyond the side edges of the pad are folded upwardly and over the top of the pad. Hence, two layers of gauze are folded over the top of the pad. By turning the pad in the manner described so that the embossed mark faces downwardly, it will be seen that but one layer of gauze will cover the mark so that the same will remain clearly visible. The described arrangement of the pad within the wrapper is also important in view of its relation to the manner of wearing the pad, certain form fitting and body hugging characteristics being obtained substantially as explained in Patent No. 1,857,854, issued May 10, 1932, to Edwin E. Glomstead.

Changes in the described construction may be made without departing from the spirit of the invention, the scope of which should be determined by reference to the following claims, the same being construed as broadly as possible, consistent with the state of the art.

We claim as our invention:—

1. In a machine for making sanitary napkins, the combination of a support, means for feeding a pad into a preliminary position spaced from said support, and blower means for delivering the pad from said preliminary position to said support and incidentally turning the pad.

2. In a machine for making sanitary napkins, the combination of a support, means for feeding a horizontally disposed pad into a position overlying but spaced vertically from said support, and pneumatic means for delivering the pad from said overlying position to said support and incidentally inverting the pad, said means comprising a blower directing a blast of air against the pad so as to effect downward and rearward turning movement of the pad.

3. In a machine for making sanitary napkins, the combination of a support, means for feeding a horizontally disposed pad into a position overlying but spaced vertically from said support, and pneumatic means for delivering the pad from said overlying position to said support and incidentally inverting the pad, said means comprising a downwardly directed blower for effecting downward turning movement of the forward edge of the pad and a horizontally directed blower for effecting rearward continuation of said downward turning movement.

4. In a machine for making sanitary napkins, the combination of a support, means for feeding an absorbent pad to a position adjacent to said support, means for temporarily supporting the pad in said position, and blower means for effecting turning of the pad about a portion of said temporary supporting means to thereby initiate delivery of the pad from said temporary support to said main support with a predetermined face of the pad in engagement with said main support.

5. In a machine for making sanitary napkins, the combination of means for propelling a strip of absorbent wadding, cutting mechanism for cutting forward end portions from said strip to form absorbent pads, means for applying a mark to that face of the pad which is uppermost when it is severed from said strip, means associated with said cutting mechanism for temporarily supporting the end portion of the strip during the cutting operation, a main support spaced downwardly from said temporary supporting means, and means for inverting and delivering the pad from its initial position on said temporary support to predetermined position on said main support.

6. In a machine for making sanitary napkins, the combination of means for propelling a strip of absorbent wadding, cutting mechanism for cutting forward end portions from said strip to form absorbent pads, means associated with said cutting mechanism for temporarily supporting the end portion of the strip during the cutting operation, a main support, and blower means for inverting and delivering the pad from its initial position on said temporary support to predetermined position on said main support.

7. In a machine for making sanitary napkins, the combination of means for propelling a strip of absorbent wadding, cutting mechanism including a cutter for severing forward end portions from said strip to form pads, means associated with said cutter for producing a mark on the top of the strip adjacent its sides and intermediate lines of severance whereby the pads produced are provided with a mark on their ends, a support, and means for delivering said pad to said support with the marks on the pad ends facing downwardly.

8. In a machine for making sanitary napkins, the combination of means for feeding a strip of absorbent wadding, means for notching out oppositely disposed, substantially triangular marginal portions of said strip, a cutter for severing forward end portions of said strip from the strip along lines connecting the apexes of the triangular notches, means for embossing the upper face of said strip adjacent its side edges and at such positions that the embossed design is disposed within the end areas of the pads cut from said strip, a support, and means for delivering said pad to said support with its embossed ends facing downwardly.

9. In a machine for making sanitary napkins, the combination of means for feeding a strip of absorbent wadding, means for notching out oppositely disposed, substantially triangular marginal portions of said strip, a cutter for severing forward end portions of said strip from the strip along lines connecting the apexes of the triangular notches, means for embossing the upper face of said strip adjacent its side edges and at such positions that the embossed design is disposed within the end areas of the pads cut from said strip, means for supporting said forward end portion adjacent the line of cutting, a support, and means for causing the severed pad to move downwardly around an edge portion of said supporting means to deliver said pad to said support in inverted position.

10. In a machine for making sanitary napkins, the combination of means for feeding a strip of absorbent wadding, means for notching out oppositely disposed, substantially triangular marginal portions of said strip, a cutter for severing forward end portions of said strip from the strip along lines connecting the apexes of the triangular notches, means for embossing the upper face of said strip adjacent its side edges and at such positions that the embossed design is disposed within the end areas of the pads cut from said strip, a shelf of less width than the width of the pad and arranged to support said pad adjacent to the line of severance of said pad from the strip, a support, and means for causing said pad to move downwardly and swing around an edge portion of said shelf so as to be delivered to said support in inverted position.

11. In a machine for making sanitary napkins, the combination of means for feeding a strip of absorbent wadding, means for notching out oppositely disposed, substantially triangular marginal portions of said strip, a cutter for severing forward end portions of said strip from the strip along lines connecting the apexes of the triangular notches, means for embossing the upper face of said strip adjacent its side edges and at such positions that the embossed design is disposed within the end areas of the pads cut from said strip, a shelf, means for yieldably supporting said shelf, means controlled by the movement of said shelf supporting means for controlling the operation of the machine, a support, and means for causing said pad to move downwardly and swing around an edge portion of said shelf so as to be delivered to said support in inverted position.

12. In a machine for making sanitary napkins, the combination of means for feeding a strip of absorbent wadding, means for severing forward end portions of said wadding strip from the strip to form pads, a support, a shelf for temporarily supporting a portion of said pad in spaced relation to said main support, a bracket carrying said shelf, means for pivotally mounting said bracket so as to facilitate adjustment of the bracket and shelf to an inoperative position for affording access to said severing means, and pneumatic means for delivering the pad from said shelf to inverted position on said support, said pneumatic means being also carried by said bracket so as to be movable from operative to inoperative position facilitating access to said severing means, a fixedly mounted blower, and a flexible conduit connecting said blower and pneumatic means.

13. In a machine for making sanitary napkins, the combination of means for propelling a strip of absorbent wadding, cutting mechanism including a cutter for severing forward end portions from said strip to form pads, means for producing a mark on the top of the strip adjacent its sides and intermediate lines of severance whereby the pads produced are provided with a mark on their ends, a support, and means for delivering said pad to said support with the marks on the pad ends facing downwardly.

CHARLES A. FOURNESS.
OSCAR E. HAGEN.